United States Patent Office.

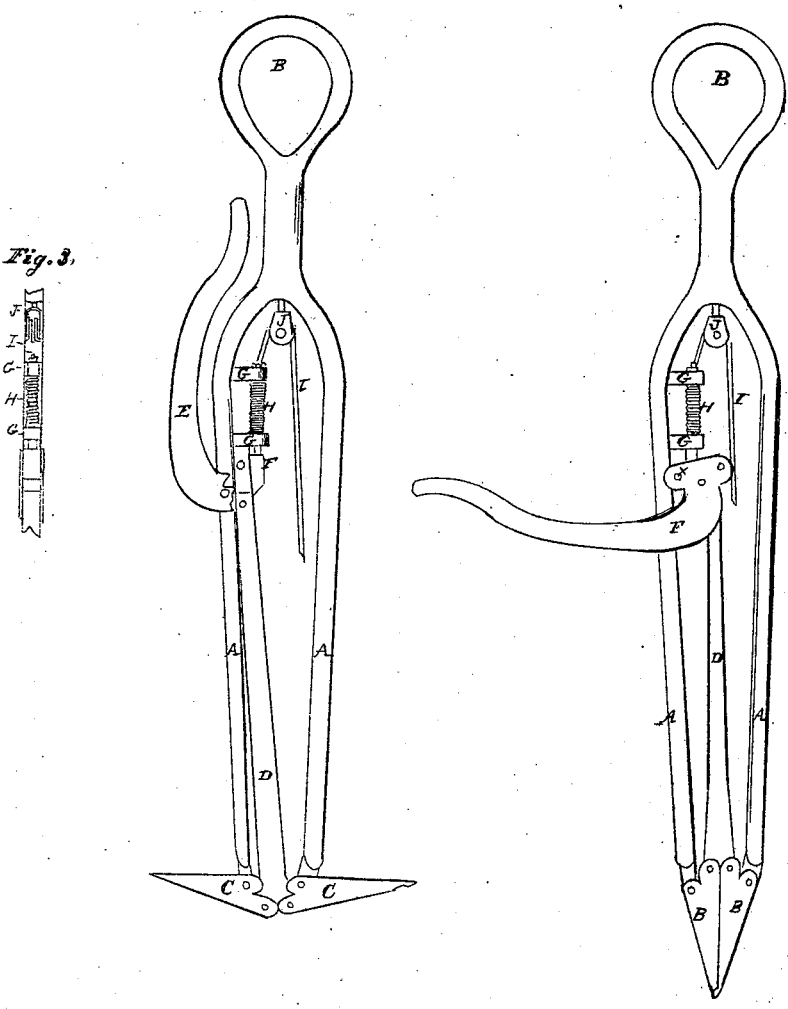

H. C. STOUFFER, JOHN HEATON, AND ALPHEUS A. BUSHONG, OF COLUMBIANA, OHIO.

Letters Patent No. 71,661, dated December 3, 1867.

---

IMPROVEMENT IN HORSE HAY-FORKS.

---

*The Schedule referred to in these Letters Patent and making part of the same.*

---

TO ALL WHOM IT MAY CONCERN:

Be it known that we, H. C. STOUFFER, JOHN HEATON, and ALPHEUS A. BUSHONG, of Columbiana, in the county of Columbiana, and State of Ohio, have invented certain new and useful Improvements in Horse Hay-Forks; and we do hereby declare that the following is a full and complete description of the same, reference being had to the accompanying drawings, making a part of this specification, in which—

Figure 1 is a side view of the fork, with the points extended.

Figure 2 is a view of the fork with the points closed.

Figure 3 is a detached section.

Like letters of reference refer to like parts in the views.

In fig. 1, A represents the shanks of the fork, which are united at the upper end, and terminate in a loop or ring, B, by which the implement is suspended. To the lower end of each shank is pivoted a foot, C, and to the keels of which is pivoted a link, D. The upper end of this link is pivoted to the minor arm of the curved lever E, and which in turn is pivoted at the point x to the shank, as shown in the drawing. F is a check-rod secured in the lugs G, and in which it is made to slide upward and downward, as and for a purpose hereafter shown. Encircling this rod, between the lugs, is a spiral spring, H, a detached section of which and of the rod, is shown in fig. 3. To the upper end of this rod is attached a rope or cord, I, which is led off over a sheave, J, and operates the rod as will shortly be shown.

The practical use of this fork is as follows: The implement is suspended over the load by any appropriate means. The points of feet C are then closed, as shown in fig. 2. The fork in this condition is thrust into the hay, and the feet then thrown out, as shown in fig. 1, and are retained in this position by the check-rod referred to, which it will be seen is forced down outside the link, below the end of the link, by the spring H, thereby resisting the link from being moved out laterally, which it must do in order to close the feet. The fork is then drawn up by the rope and pulleys, by which it is suspended, and conveyed, together with the hay, over to the bay or stack on which it is to be dropped. The fork is then tripped by pulling down on the cord I, the effect of which is to draw up the check-rod above the end of link D, which will allow the link to move outward, and at the same time to drop downward, in consequence of the weight of the hay, and thereby bring the feet together, as shown in fig. 2, and the hay will fall from the fork into the bay or stack. In consequence of uniting the shanks solidly together at the top, the feet are prevented from being forced apart while being intruded into the hay by the shanks acting as a spring of more or less tension, according to the strength and size of the fork.

What we claim as our improvement, and desire to secure by Letters Patent, is—

The curved lever E, check-rod F, and spring H, as arranged, in combination with the link D and feet C, in the manner as and for the purpose described.

H. C. STOUFFER,
JOHN HEATON,
ALPHEUS A. BUSHONG.

Witnesses:
J. H. BURRIDGE,
J. G. HASEROT.